(12) United States Patent
Fu et al.

(10) Patent No.: US 7,724,468 B2
(45) Date of Patent: May 25, 2010

(54) APPARATUS AND METHOD FOR CORRECTING STATIC AND DYNAMIC IMBALANCE WITH A SINGLE MASS IN A HARD DISK DRIVE

(75) Inventors: Ta-Chang Fu, San Jose, CA (US); Andrew K. Hanlon, San Jose, CA (US); Robert Lenicheck, Palo Alto, CA (US); Stanley Y. Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1146 days.

(21) Appl. No.: 11/074,441

(22) Filed: Mar. 8, 2005

(65) Prior Publication Data
US 2006/0203378 A1    Sep. 14, 2006

(51) Int. Cl.
*G11B 17/08* (2006.01)
(52) U.S. Cl. ............................................. 360/98.07
(58) Field of Classification Search .............. 360/98.07, 360/98.05, 98.04, 99.12, 69, 75, 71; 369/53.14, 369/53.3
See application file for complete search history.

(56) References Cited

U.S. PATENT DOCUMENTS

| | | | |
|---|---|---|---|
| 3,817,088 A | 6/1974 | Herbig | |
| 3,838,464 A | 9/1974 | Doyle | |
| 3,854,347 A | 12/1974 | Hellerich | |
| 4,561,035 A | 12/1985 | McDorman et al. | |
| 5,016,131 A * | 5/1991 | Riggle et al. | 360/264.7 |
| 5,111,713 A | 5/1992 | Cameron et al. | |
| 5,422,776 A | 6/1995 | Thorson et al. | |
| 5,621,588 A | 4/1997 | Williams et al. | |
| 5,915,274 A | 6/1999 | Douglas | |
| 6,105,240 A | 8/2000 | Chuang et al. | |
| 6,122,139 A * | 9/2000 | Sri-Jayantha et al. | 360/97.02 |
| 6,178,063 B1 * | 1/2001 | Wood et al. | 360/98.08 |
| 6,348,747 B1 * | 2/2002 | Liao et al. | 310/51 |
| 6,351,043 B1 * | 2/2002 | Wolf et al. | 310/51 |
| 6,356,409 B1 | 3/2002 | Price et al. | |
| 6,550,328 B1 | 4/2003 | Horning et al. | |
| 6,608,733 B2 | 8/2003 | Elsing | |
| 6,693,757 B2 * | 2/2004 | Hayakawa et al. | 360/69 |
| 6,707,639 B1 * | 3/2004 | Pfeiffer et al. | 360/99.08 |
| 6,947,253 B2 * | 9/2005 | Pfeiffer et al. | 360/99.08 |
| 2002/0054454 A1 * | 5/2002 | Chen et al. | 360/99.12 |
| 2002/0163756 A1 * | 11/2002 | Chen et al. | 360/99.12 |
| 2003/0192166 A1 | 10/2003 | Kelemen | |
| 2004/0194291 A1 * | 10/2004 | Pfeiffer et al. | 29/603.03 |
| 2005/0122624 A1 * | 6/2005 | Ng | 360/133 |
| 2006/0087764 A1 * | 4/2006 | Fu et al. | 360/99.08 |
| 2007/0121242 A1 * | 5/2007 | Lee et al. | 360/98.02 |
| 2008/0247889 A1 * | 10/2008 | Bin-Nun et al. | 417/415 |
| 2009/0016907 A1 * | 1/2009 | Williamson et al. | 417/365 |

FOREIGN PATENT DOCUMENTS

| | | |
|---|---|---|
| DE | 3743302 | 6/1989 |
| EP | 0718839 A2 | 6/1996 |
| JP | 2229940 | 9/1990 |

* cited by examiner

*Primary Examiner*—Allen T Cao (57) ABSTRACT

An apparatus and method for correcting static and dynamic imbalance with a single mass in a hard disk drive is disclosed. The method provides for determining a static imbalance of a hard disk assembly and for determining a dynamic imbalance of the hard disk assembly. A greater imbalance from the static imbalance and the dynamic imbalance is determined. A single mass is applied to the hard disk assembly to correct the greater imbalance.

34 Claims, 7 Drawing Sheets

FIG. 7

APPARATUS AND METHOD FOR CORRECTING STATIC AND DYNAMIC IMBALANCE WITH A SINGLE MASS IN A HARD DISK DRIVE

TECHNICAL FIELD

Embodiments of the present invention relate to the field of hard disk drives, and more particularly to an apparatus and method for correcting static and dynamic imbalance with a single mass in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPM) can be achieved. For example, it is not uncommon for a hard disk drive to reach speeds of 15,000 RPM. This second refinement provides weight and size reductions to the hard disk drive and increases the linear density of information per track. Increased rates of revolution also provide a faster read and write rate for the disk and decrease the latency, or time required for a data area to become located beneath a head, thereby providing increased speed for accessing data. The increase in data acquisition speed due to the increased RPM of the disk drive and the more efficient read/write head portion provide modern computers with hard disk speed and storage capabilities that are continually increasing.

However, such high rates of revolution of the disk have produced a greater need for accurate balancing of the disk pack, in a manner analogous to the need to balance the wheels of an automobile.

Figure 1:
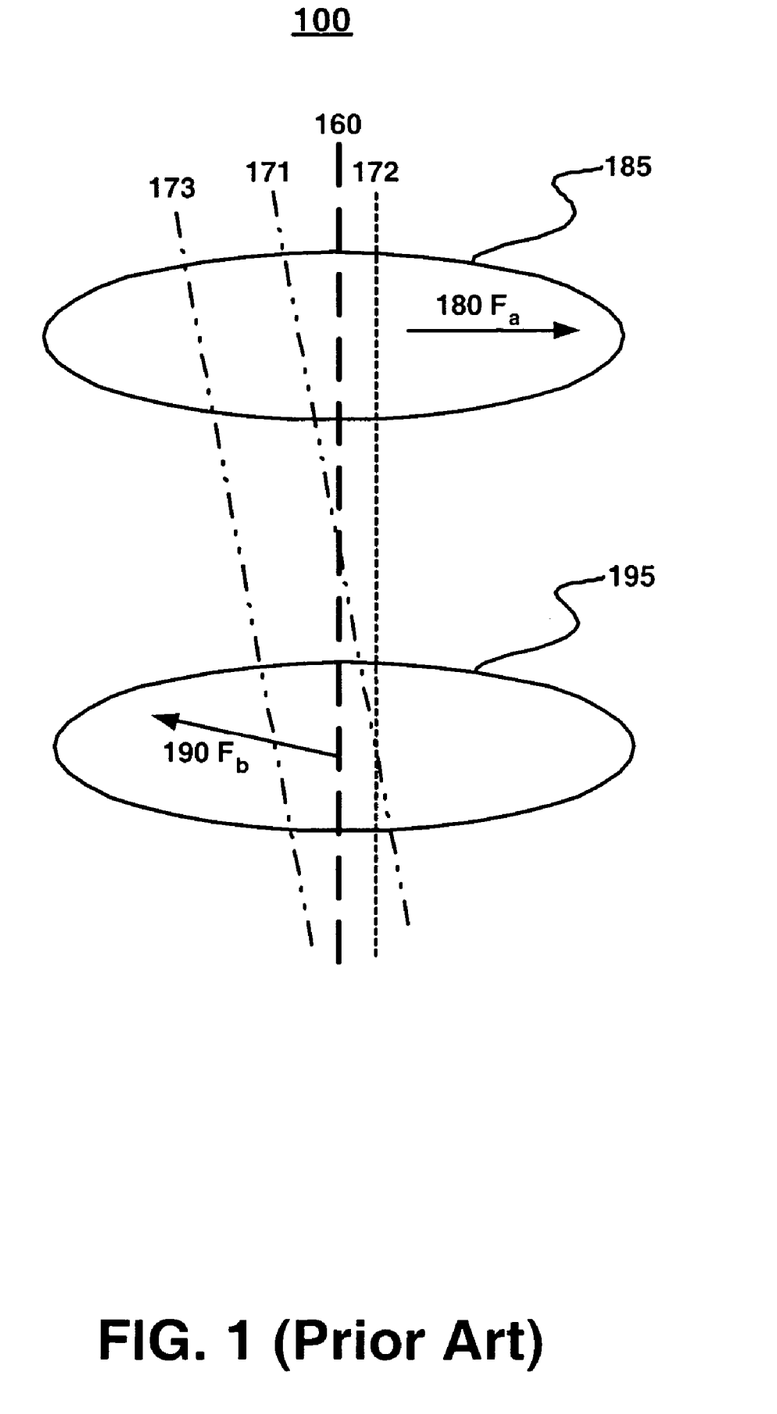
FIG. 1 illustrates forces acting around a rotational access in accordance with conventional art.

In general, unbalance during rotation occurs when the physical axis about which the body is rotating (e.g., the mounted rotational axis such as the central drive hub) and the mass axis of the rotating body (e.g., the mathematical axis of balance or the inertial axis) are not aligned. Normally, the non-alignment of the rotational axis and the inertial axis occurs in three forms. That is, as shown in Prior Art FIG. 1, the rotational axis 160 and the inertial axis (e.g., axis 172) may be parallel to each other, the rotational axis 160 and the inertial axis (e.g., axis 171) may intersect each other, or the rotational axis 160 and the inertial axis (e.g., axis 173) may not be parallel or intersect each other.

When the rotational axis 160 and the inertial axis (e.g., axis 172) are parallel to each other this is known as static or single-plane unbalance. As apparent from Prior Art FIG. 1, the magnitude of the force created by the static imbalance is equal across the length of the spinning component (e.g., from the top to the bottom). Moreover, the direction of the force vectors is also constant across the component.

When the rotational axis 160 and the inertial axis (e.g., axis 171) intersect each other this is known as a couple unbalance. As apparent from Prior Art FIG. 1, the magnitude of the force created by the couple imbalance are equal at both ends of the spinning component (e.g., the top and the bottom), but the force vectors while equal in magnitude on both ends of the component are opposite in direction.

When the rotational axis 160 and the inertial axis (e.g., axis 173) may not be parallel or intersect each other this is known as dynamic or coupled-plane unbalance. As apparent from Prior Art FIG. 1, the magnitude of the force created by the dynamic imbalance is not equal across the length of the spinning component (e.g., differs from the top to the bottom) and the force vectors on both ends may differ substantially. For example, the top imbalance plane 185 has an imbalance force vector 180, shown as $F_a$, pointing at an angle which is different from the angle of the imbalance force vector 190 from the bottom imbalance plane 195, shown as $F_b$. As is apparent, the chances of the imbalance force vector $F_a$ 180 randomly aligning with the imbalance force vector $F_b$ 190 is extremely minimal.

Without proper balance, a spinning disk pack can vibrate undesirably. Such vibrations can have numerous deleterious effects. For example, disk vibration can change a relative position between a head and a disk. Such detrimental changes in head positioning can result in less reliable read/write performance of a hard disk drive, including, for example, track misalignment, an inability to read a desired track and/or deleteriously overwriting an adjacent track. In addition, disk vibration can result in the production of undesired sound energy. For example, unwanted disk vibration can produce an undesirable sound energy in the disk drive enclosure and/or in a disk drive mounting system. Such sound energy can produce unwanted audio noise in a computer system, e.g., a desktop computer system, leading to an unacceptable experience for a computer user.

Further, disk vibration can cause other deleterious effects. For example, vibrations from one hard disk drive can be mechanically coupled to other hard disk drives in a system, leading to a variety of ill effects across many drives within a drive mounting system.

Disk vibration has at least one other highly undesirable consequence related to overall disk reliability. Modern electronic systems, e.g., computer electronics, are highly reliable. Moving parts of computer systems, e.g., fans and hard disk drives, are generally the least reliable components of such systems. As a consequence, a great deal of engineering effort has been invested in making such components more reliable in a quest to make the overall system more reliable. In addition to other deleterious effects, disk vibration induced by pack imbalance(s) leads to increased wear and hence lessened reliability of a spindle motor and its bearings within a hard disk drive. For example, a hard disk drive with low frequency vibration will tend to wear out, or fail, sooner than a similar hard disk drive without such deleterious vibrations. Consequently, drive vibration induced by pack imbalance(s) lead to undesirably decreased system reliability.

Conventionally, two masses are utilized to balance a disk drive comprising multiple disks. A first mass is placed on top of a disk and/or disk-spindle motor assembly, and a second mass is placed on the bottom of the disk and/or disk-spindle motor assembly, generally offset in angle with respect to the first mass. The proper positioning and selection of these two masses can correct a static and dynamic imbalance of a disk and/or disk-spindle motor assembly.

However, just as the need for better balancing of disk packs has increased due to ever increasing disk revolution rates, the overall reduction in drive and component size coupled with decreased "empty" space within a hard disk drive, has made it more difficult to balance such disks. For example, as the overall height, or thickness, of a hard disk drive decreases, and/or a number of platters increases, there is less space available for the addition of balancing masses to a disk or stack of disks. Additionally, manufacturing processes utilized to assemble small, highly dense hard disk drives have difficulty accommodating additional process steps that may be required to add balancing masses to disks.

Further, as modern heads "fly" extremely close to a disk, the environment within a hard disk drive must be kept very clean. For example, hard disk drives are typically manufactured in class-100 clean rooms, and incorporate filters to clean the air inside of a hard disk drive. The introduction of balance masses may introduce undesirable contaminants to the head disk enclosure, either via the masses themselves and/or via additional manufacturing process steps required to add the masses to the drive. Additionally, inclusion of additional parts, e.g., balancing masses, deleteriously requires additional process steps to clean such parts, incurring further undesirable manufacturing costs.

Yet another drawback to the use of balance masses is the direct cost of such balance masses. If utilized, such balance masses should be produced to very strict engineering specifications, e.g., for material, diameter, shape, density etc. As such, the unit cost for such balance masses can be both unexpectedly and undesirably high. It is appreciated that the manufacturing process steps required to place such balance masses further incur process costs, e.g., process time and/or additional manufacturing equipment. Consequently, it would be advantageous to eliminate at least one such balance mass.

Accordingly, there is a need for apparatus and methods for correcting static and dynamic imbalance with a single mass in a hard disk drive. Additionally, in conjunction with the aforementioned need, methods and systems for correcting both static and dynamic imbalances in a disk stack are desired. A further need, in conjunction with the aforementioned needs, is for balancing disk assemblies in a manner that is compatible and complimentary with existing hard disk systems and manufacturing processes.

SUMMARY

An apparatus and method for correcting static and dynamic imbalance with a single mass in a hard disk drive are disclosed. The method provides for determining a static imbalance of a hard disk assembly and for determining a dynamic imbalance of the hard disk assembly. A greater imbalance from the static imbalance and the dynamic imbalance is determined. A single mass is applied to the hard disk assembly to correct the greater imbalance.

BRIEF DESCRIPTION OF THE DRAWINGS

Prior Art

BEST MODES FOR CARRYING OUT THE INVENTION

Reference will now be made in detail to the alternative embodiment(s) of the present invention, an apparatus and method for correcting static and dynamic imbalance with a single mass in a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Some portions of the detailed descriptions that follow (e.g., method 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "calculating" or "delaying" or "measuring" or "terminating" or "initiating" or "locating" or "indicating" or "transmitting" or "receiving" or "advancing" or "comparing" or "processing" or "computing" or "translating" or "determining" or "excluding" or "displaying" or "recognizing" or "generating" or "assigning" or "initiating" or "collecting" or "transferring" or "switching" or "accessing" or "retrieving" or "receiving" or "issuing" or "measuring" or "conveying" or "sending" or "dispatching" or "advancing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
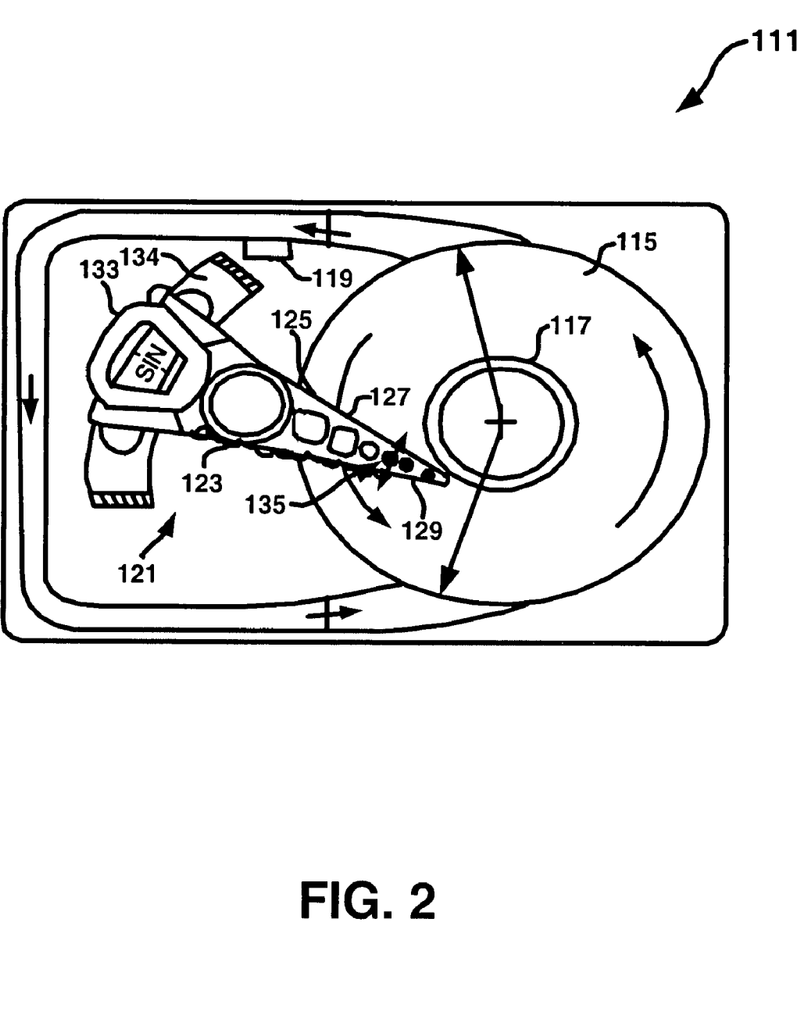
FIG. 2 is a schematic, top plan view of a hard disk drive in accordance with an embodiment of the present invention.

Apparatus and Method for Correcting Static and Dynamic Imbalance with a Single Mass in a Hard Disk Drive FIG. 2 is a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be of "femto" size (approximately 850× 700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 3:
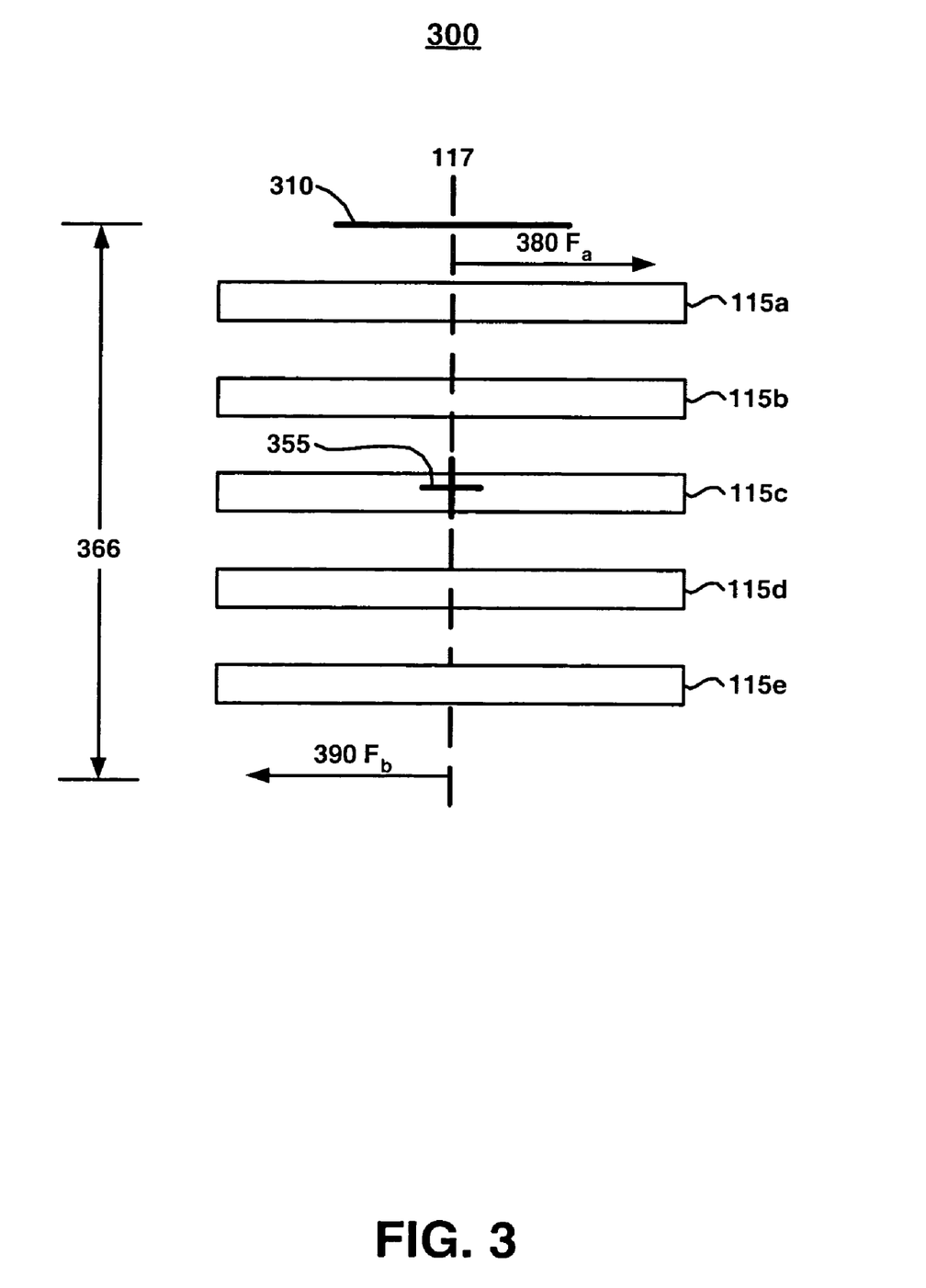
FIG. 3 illustrates a side sectional view of disk assembly, in accordance with embodiments of the present invention.

FIG. 3 illustrates a side sectional view of disk assembly 300, in accordance with embodiments of the present invention. Disk assembly 300 corresponds to disk(s) 115 of FIG. 2. Five disks or platters, 115a, 115b, 115c, 115d and 115e are shown. It is appreciated that disk assembly 300 may comprise more or less platters than herein depicted in accordance with alternative embodiments of the present invention.

In general, disk assembly 300 will have a rotational imbalance. Any single platter, e.g., platters 115a, 115b, 115c, 115d and 115e, can be out of rotational balance. For example, disk 115a can be unbalanced, e.g., the disk itself is unbalanced and/or it was mounted off center to central drive hub 117. As described in detail herein, the imbalance with respect to a single rotating plane is referred to as a static (or as a single plane) imbalance.

Moreover, as also described in detail herein, unbalanced masses or weights rotating about a common axis in two (or more) separate planes of rotation are referred to as a dynamic (or coupled) imbalance. In a manner similar to the exemplary unbalanced platter 15a, one or more of the other platters, e.g., 115e will typically have some rotational imbalance. As an unfortunate result, two or more platters of disk assembly 300, which essentially rotate in their own planes about a common axis of rotation 117 having a center of gravity (CG) 355, e.g., the centerline of central drive hub 117 will be unbalanced.

In accordance with dynamic mechanical theory, a combination of such static and dynamic unbalance moments requires an equal and opposite counter-balancing moment to rotationally balance the disk assembly. Although a theoretical absolute rotational balance is possible, the tangible balance accomplished with the addition of weights is most often imperfect but is judged acceptable if it falls within a desired balance tolerance range. Such an equal and opposite counter-balancing moment can be created by placing two masses on to disk assembly 300. In general, the masses will be off center with respect to the rotational axis, and off center with respect to the geometric center 355 of disk assembly 300 as seen in side sectional view in FIG. 3. The two masses are placed so as to counter moments created by a static imbalance and a dynamic imbalance.

Conventionally, most disk assemblies, including multi-platter assemblies, e.g., an assembly with two or more platters, and those assemblies operating at very high revolution rates, are balanced with two counter-balancing masses. Typically, one counter-balancing mass is placed at the top of the disk assembly, e.g., at the top of central drive hub 117, and a second counter-balancing mass is placed at the bottom of the disk assembly, e.g., at the bottom of central drive hub 117. By using two masses additional cost, additional yield issues, additional throughput issues, more potential for mistakes, etc. the present invention is able to achieve an acceptable level of balance by utilizing only a first mass and without requiring additional masses. In general, high-speed revolution rates are greater than 7000 revolutions per minute (RPM). However, it is appreciated that the high-speed revolution rates may be significantly lower or equal to 7000 RPM.

Figure 4:
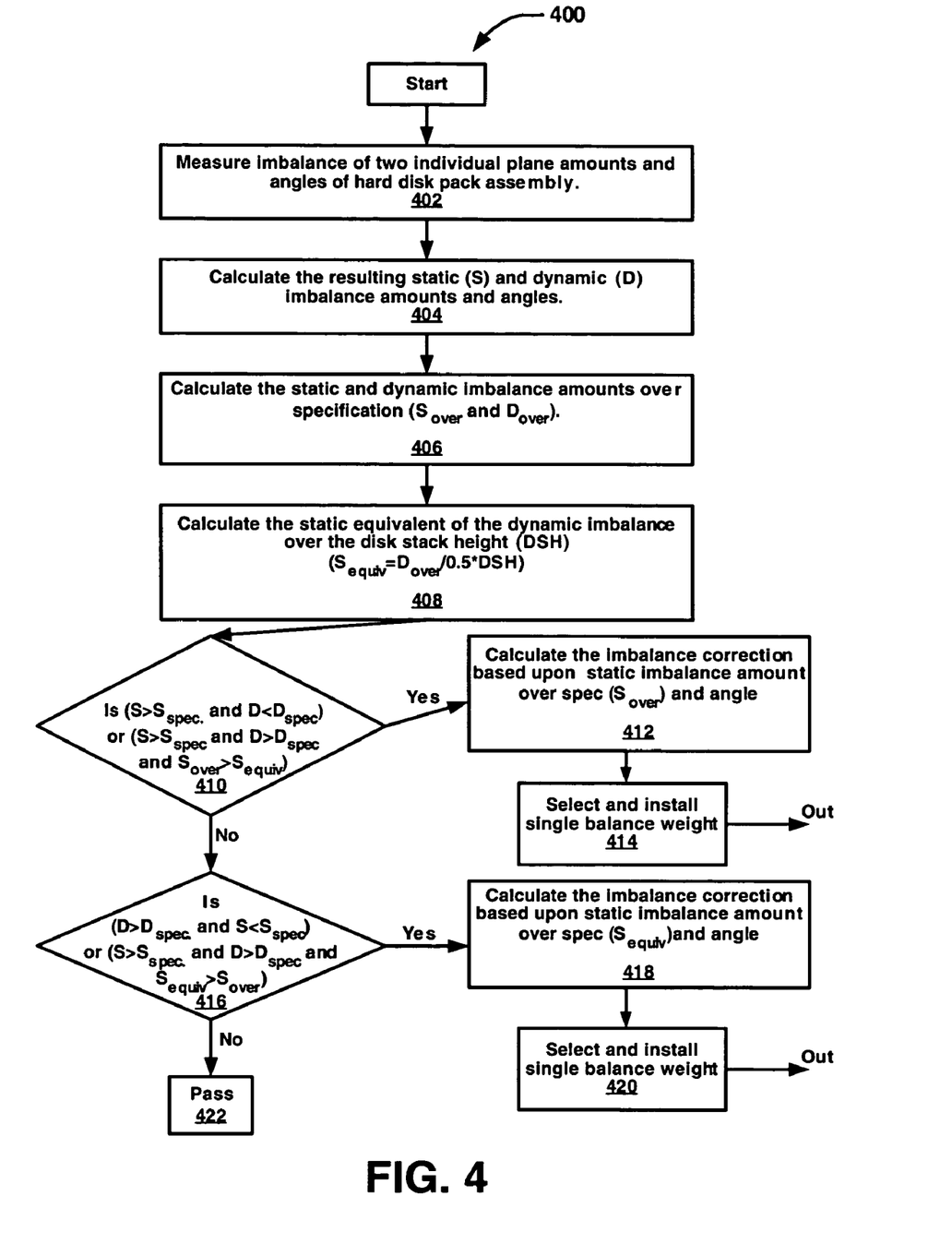
FIG. 4 is a flowchart of an exemplary method for correcting imbalance in a hard disk assembly, in accordance with embodiments of the present invention.

FIG. 4 illustrates a method 400 for correcting static and/or dynamic imbalance in a hard disk assembly with the addition of only a single balance weight, in accordance with embodiments of the present invention. That is, instead of utilizing a set of weights to counteract the unbalanced forces acting within the hard disk pack, a single weight is utilized to counteract the unbalanced forces resulting in a hard disk pack within balance tolerances.

With reference now to step 402 of FIG. 4 and FIG. 3, one embodiment measures the imbalance of two individual plane amounts and angles of the hard disk pack assembly. In one embodiment, the individual measurements are similar to measurement 380 and measurement 390 of FIG. 3 which are vector measurements. That is, measurements having both force and direction components taken at both the top of the disk pack and the bottom of the disk pack. In anther embodiment, the individual measurements are not taken at the top and bottom of the disk pack assembly (or disk stack), but are instead taken near the top and near the bottom of the disk stack. In such a case, an extrapolation can be performed to calculate the force vectors for the top and bottom portion of the hard disk pack assembly.

Figure 5:
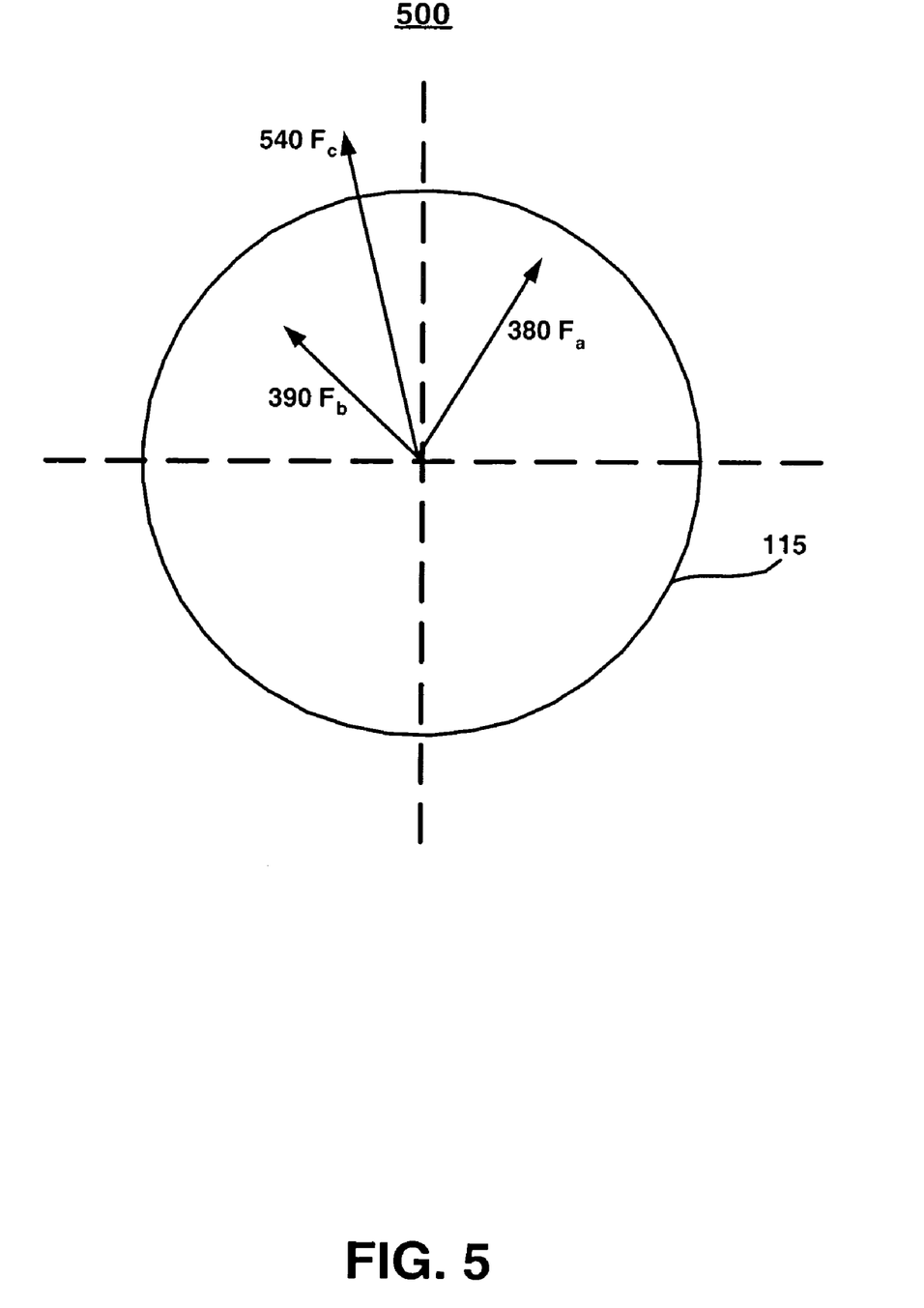
FIG. 5 illustrates a top view of disk pack in accordance with one embodiment of the present invention.
Figure 6:
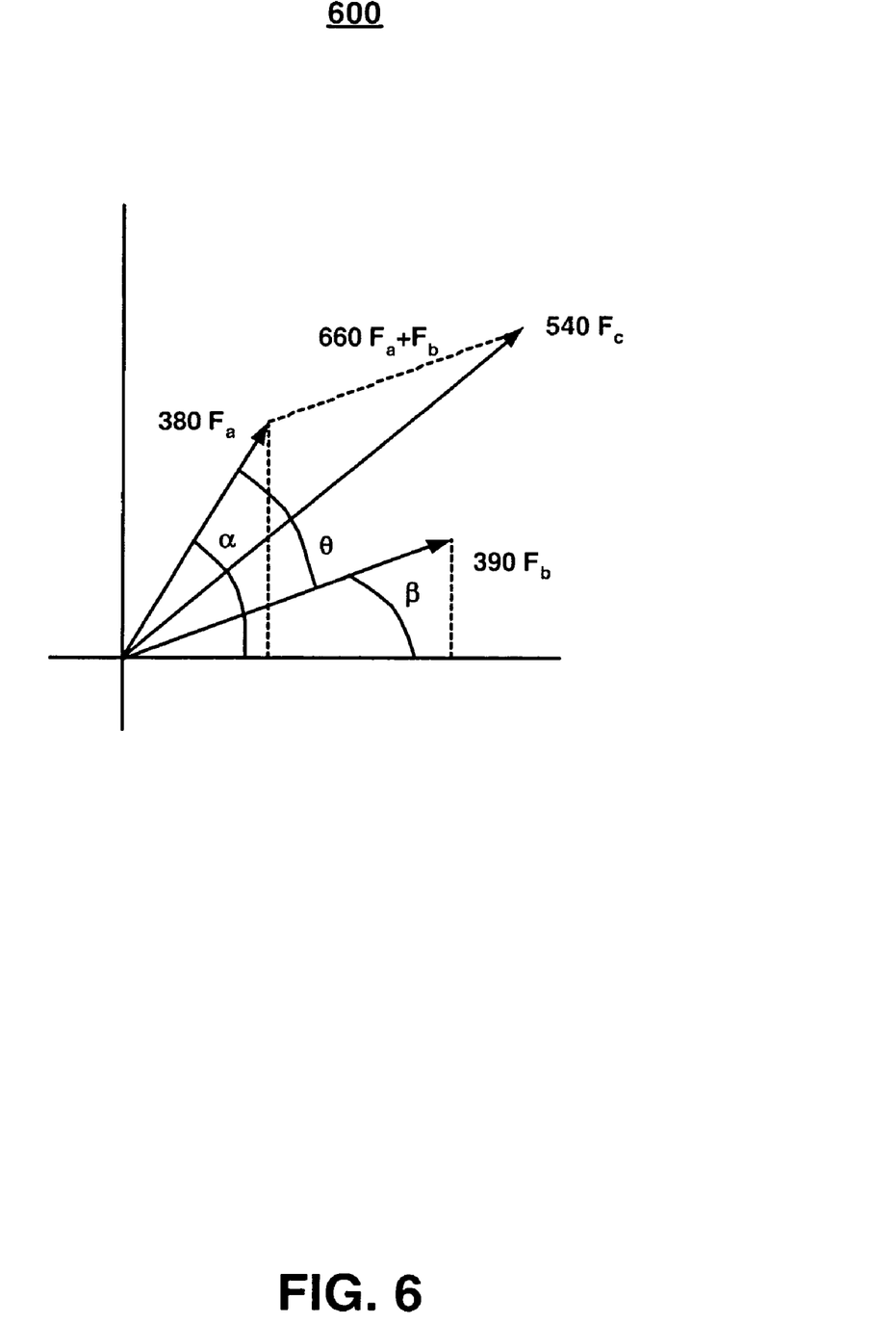
FIG. 6 illustrates an exemplary static vector graph in accordance with one embodiment of the present invention.
Figure 7:
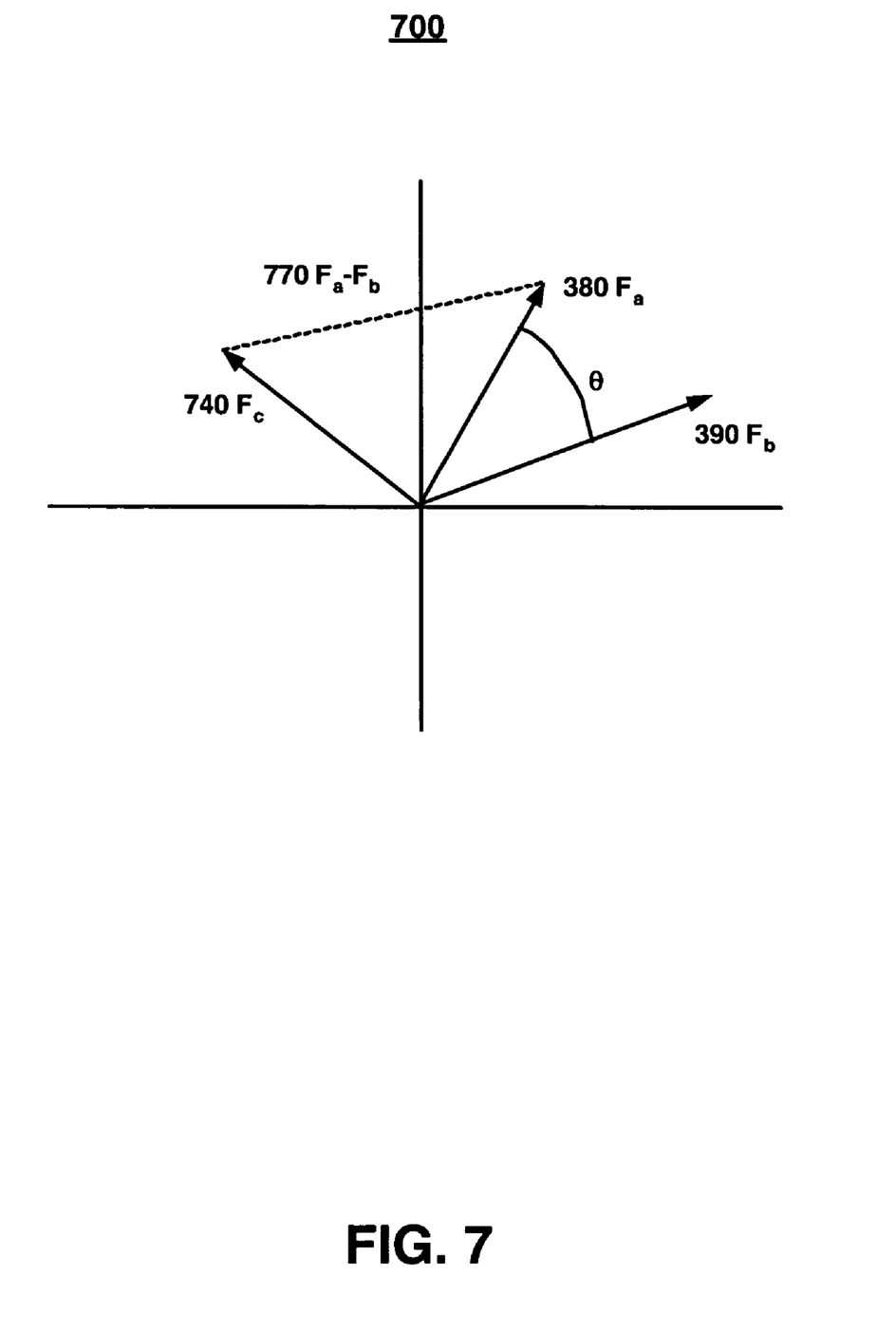
FIG. 7 illustrates an exemplary dynamic vector graph in accordance with one embodiment of the present invention.

Referring now to step 404 of FIG. 4 and to FIGS. 5-7, one embodiment calculates the resulting static (S) and dynamic (D) imbalance amounts and angles. For example, FIG. 5 illustrates a view 500 looking from the top of the disk pack 115. In FIG. 5, the top measured imbalance 380 and the bottom measured imbalance 390 are shown within the same plane. Moreover, the resultant static imbalance force vector 540 is also shown. In general, the force vector 540 is the single force vector resultant calculated from top (e.g., vector 380) and bottom (e.g., vector 390) individual plane values. That is, the force vector 540 is the resultant force amount acting at a distance from the center of rotation. Mathematically, $F_a + F_b = F_c$.

Referring still to step 404 and now to FIG. 6, one embodiment illustrates a second method for performing a static (or one plane) calculation using well-known vector calculations. That is, the vector 380 and the vector 390 are added (e.g., equation 660) and the resultant vector 640 is the one plane calculation. Although a plurality of methods for performing the static calculation are shown, there may be a plurality of methods for performing the calculation (e.g., halfway to top and halfway to bottom measurements followed by an extrapolation calculation, or the like) that are well within the scope of the present invention.

Referring still to step 404 and now to FIG. 7 one exemplary embodiment illustrates a method for performing the dynamic (or coupled-plane) calculation using well-known vector calculations. For example, in graph 700 the first vector 380 is subtracted from the second vector 390, as shown in equation 770, to provide the resultant force vector 740. Although an exemplary method for performing the dynamic calculation is shown, there may be a plurality of methods for performing the calculation (e.g., halfway to top and halfway to bottom measurements followed by an extrapolation calculation, or the like) that are well within the scope of the present invention.

Referring now to step 406 of FIG. 4, one embodiment calculates the static ($S_{over}$) and dynamic ($D_{over}$) imbalance over specification ($S_{spec}$ and $D_{spec}$ respectively). That is, the resultant vectors from the calculations of step 404 are compared with the specification for the component in question (e.g., the disk pack 115).

With reference now to step 408 of FIG. 4 and to FIG. 3, one embodiment calculates the static equivalent ($S_{equiv}$) of the dynamic imbalance over the disk stack height (DSH). The DSH is shown by 366 of FIG. 3. In one embodiment, the calculation of $S_{equiv}$ utilized $D_{over}$ divided by one half of the DSH, e.g., $S_{equiv} = D_{over}/(0.5 DSH)$.

With reference now to step 410 of FIG. 4, an evaluation is performed. In one embodiment, the evaluation is whether ($S > S_{spec}$ and $D < D_{spec}$) or ($S > S_{spec}$ and $D > D_{spec}$ and $S_{over} > S_{equiv}$). That is, it is determined whether the static imbalance or the static specification is greater. In other words, is the static imbalance over tolerances, or is $S_{over}$ more than $S_{equiv}$ if both static imbalance and dynamic imbalance are over tolerances? Such determination can be made in absolute terms or in comparison to a balance specification for the hard disk assembly.

If only the static imbalance is greater than the static specification, or if both the static imbalance and the dynamic imbalance are greater than their specifications but $S_{over}$ is more than $S_{equiv}$, then step 412, the imbalance correction is calculated based on the static imbalance amount over specification ($S_{over}$) and angle (e.g., force vector). Then step 414, the selection and installation of a single balance weight (or mass) is performed on the hard disk assembly. For example, exemplary balance mass 310 is shown coupled to the top of disk assembly 300 in FIG. 3. Exemplary balance mass 310 is well suited to a variety of shapes and sizes to achieve a counter-balancing effect. For example, in one embodiment, the balance mass 310 is a "C" shape. In another embodiment, the balance mass 310 is rectangular, square, triangular, circular or a plurality of other geometric or abstract shapes. Moreover, exemplary balance mass 310 may be placed at any location throughout the disk stack. The location of the mass 310 in the present example is merely for purposes of clarity.

Referring now to step 416 of FIG. 4, if the static imbalance is not greater than the static specification, then a second evaluation is performed. In one embodiment, the evaluation is whether ($D > D_{spec}$ and $S < S_{spec}$) or ($S > S_{spec}$ and $D > D_{spec}$ and $S_{equiv} > S_{over}$). That is, it is determined whether the dynamic imbalance or the dynamic specification is greater. In other words, is the dynamic imbalance over tolerances, or is $S_{equiv}$ more than $S_{over}$ if both static imbalance and dynamic imbalance are over tolerances? Such determination can be made in absolute terms or in comparison to a balance specification for the hard disk assembly. If the dynamic imbalance is not greater than the dynamic imbalance specification, then the device is within specification and passes 422 as being within tolerance and requiring no balance weight.

However, if the dynamic imbalance is greater than the dynamic specification, then step 418, the imbalance correction is calculated based on the dynamic imbalance amount and angle (e.g., force vector). Then step 420, the selection and installation of a single balance weight (or mass) is performed on the hard disk assembly. For example, exemplary balance mass 310 is shown coupled to the top of disk assembly 300 in FIG. 3. Exemplary balance mass 310 is well suited to a variety of shapes and sizes to achieve a counter-balancing effect. For example, in one embodiment, the balance mass 310 is a "C" shape. In another embodiment, the balance mass 310 is rectangular, square, triangular, circular or a plurality of other geometric or abstract shapes. Moreover, exemplary balance mass 310 may be placed at any location throughout the disk stack. The location of the mass 310 in the present example is merely for purposes of clarity.

For example, after measurement it is determined that a particular head disk assembly has a 5% static imbalance, and a 10% dynamic imbalance. In accordance with embodiments of the present invention, the 10% dynamic imbalance would then be corrected with a single mass placed so as to correct the dynamic imbalance. It is appreciated that the static imbalance may not always be directly countered. In another embodiment, the hard disk assembly with the single counter-balance mass is measured for conformance to both static and dynamic balance specifications.

In accordance with embodiments of the present invention, the counter-balancing mass can be chosen from a plurality of masses, representing discrete steps or quanta of mass, for example, 1.0 gram, 2.0 grams, etc. For example, it is not necessary to utilize a mass that exactly counter balances an imbalance, e.g., 1.837 grams. In many cases, a suitably close mass, e.g., 2.0 grams, will provide a sufficient balancing moment. Such a set of masses can be constructed by varying the length of the added mass or masses. For example, a 1.0 gram mass could be constructed from a 4.0 mm length of wire, whereas a 2.0 gram mass could be constructed from an 8.0 mm length of wire. This embodiment enables a fixed inventory of counter-balancing masses to be utilized to balance a hard disk assembly, beneficially limiting inventory costs and enhancing production throughput.

In accordance with embodiments of the present invention, it is frequently desirable to add such a single mass to the top of a hard disk assembly. The top of a hard disk assembly is generally characterized as that portion nearest a cover. In the assembly of hard disk drives, generally a disk assembly is inserted into a housing, the housing providing most of the mechanical support for the disk assembly and the head-gimbal assembly. Consequently, the top portion of a hard disk assembly is generally accessed in a more straightforward manner than is the bottom portion.

Advantageously, in comparison to the conventionally art, this novel method utilizes a single counter-balance mass, eliminating numerous deleterious aspects of a second mass, including the per piece cost of a second mass, additional contamination opportunities associated with a second mass and additional manufacturing process steps and costs associated with a second mass.

Additional advantages can derive from not designing a second counter-balancing mass into a hard disk drive and into an associated manufacturing process. As described previously, there is generally little space available within a hard disk drive, particularly at the bottom of a disk stack. Consequently, features must be designed to accommodate a second counter-balancing mass. Further, production processes and/or production equipment must be designed to attach and align a second counter-balancing mass. By utilizing embodiments in accordance with the present invention, the design costs, including duration as well as design and manufacturing engineering resources, that would have been dedicated to designing for a second counter-balancing mass can beneficially be eliminated and/or utilized elsewhere.

Thus, embodiments of the present invention provide an apparatus and method for correcting static and dynamic imbalance with a single mass in a hard disk drive. Additionally, embodiments provide a method and system for correcting both static and dynamic imbalances in a disk stack. Embodiments of the present invention further provide for balancing disk assemblies in a manner that is compatible and complimentary with existing hard disk systems and manufacturing processes.

While the method of the embodiment illustrated in flowchart 400 shows specific sequences and quantity of operations, the present invention is suitable to alternative embodiments. For example, not all the operations provided for in the methods are required for the present invention. Furthermore, additional operations can be added to the operations presented in the present embodiment. Likewise, the sequences of operations can be modified depending upon the application.

Embodiments in accordance with the present invention, apparatus and method for correcting static and dynamic imbalance with a single mass in a hard disk drive, are thus described. While the present invention has been described in particular embodiments, it should be appreciated that the present invention should not be construed as limited by such embodiments, but rather construed according to the below claims.

What is claimed is:

1. A method for correcting imbalance in a hard disk assembly comprising:
   determining a static imbalance of said hard disk assembly;
   determining a dynamic imbalance of said hard disk assembly;
   determining a greater imbalance from said static imbalance and said dynamic imbalance; and
   applying a single weight to said hard disk assembly to correct said greater imbalance.

2. The method of claim 1 wherein said determining a greater imbalance comprises comparing said static imbalance and said dynamic imbalance to balance specifications of said hard disk assembly.

3. The method of claim 1 further comprising measuring said hard disk assembly after application of said single counter-balance weight for conformance to both a static and a dynamic balance specifications.

4. The method of claim 1 wherein said single weight is selected from a fixed set of available weights.

5. The method of claim 1 wherein said fixed set of available weights comprise weights that differ from one another substantially only in length.

6. The method of claim 1 wherein said single weight is applied to approximately the top of said hard disk assembly.

7. The method of claim 1 wherein said single weight is applied to approximately the bottom of said hard disk assembly.

8. The method of claim 1 wherein said single weight is applied to approximately the middle of said hard disk assembly.

9. The method of claim 6 wherein said single weight is positioned to correct a dynamic imbalance.

10. A hard disk drive comprising:
    a disk assembly comprising a plurality of disks and a spindle motor; and
    a single counter balance weight that corrects both a static imbalance and a dynamic imbalance in said disk assembly.

11. The hard disk drive of claim 10 wherein said plurality of disks comprises at least two disks.

12. The hard disk drive of claim 10 wherein said counter balance weight is mounted to approximately the top of said disk assembly.

13. The hard disk drive of claim 10 wherein said counter balance weight is mounted to approximately the bottom of said disk assembly.

14. The hard disk drive of claim 10 wherein said counter balance weight is mounted to approximately the middle of said disk assembly.

15. The hard disk drive of claim 10 wherein said static and said dynamic imbalances comprise a plurality of force measurements measured from a top and a bottom disk of the plurality of disks.

16. The hard disk drive of claim 10 wherein said disk assembly operates at greater than about 7000 revolutions per minute.

17. The hard disk drive of claim 16 wherein said disk assembly has a diameter of greater than about 1.8 inches.

18. The hard disk drive of claim 10 wherein said counter balance weight is characterized as having a "C" shape.

19. A hard disk drive comprising:
    a housing;
    a disk pack mounted to said housing and comprising a plurality of disks that are rotatable relative to said housing;

said disk pack comprising a motor to rotate said disk pack relative to said housing; and a single balance weight mounted to said disk pack, said single balance weight corrects both a static imbalance and a dynamic imbalance in said disk assembly.

20. The hard disk drive of claim 19 wherein said plurality of disks comprises at least two disks.

21. The hard disk drive of claim 19 wherein said balance weight is mounted to approximately the top of said disk pack.

22. The hard disk drive of claim 19 wherein said balance weight is mounted to approximately the bottom of said disk pack.

23. The hard disk drive of claim 19 wherein said balance weight is mounted to approximately the middle of said disk pack.

24. The hard disk drive of claim 21 wherein said static and said dynamic imbalances comprise a plurality of force measurements measured from a top and a bottom disk of the plurality of disks.

25. The hard disk drive of claim 19 wherein said disk pack operates at greater than about 7000 revolutions per minute.

26. An apparatus for correcting imbalance in a hard disk assembly comprising:

means for measuring a static imbalance of said hard disk assembly;

means for measuring a dynamic imbalance of said hard disk assembly;

means for determining a greater imbalance from said static imbalance and said dynamic imbalance; and single weight means for correcting said greater imbalance of said hard disk assembly.

27. A method for correcting imbalance in a hard disk assembly comprising:

determining a static imbalance of said hard disk assembly;

determining a dynamic imbalance of said hard disk assembly;

determining a greater imbalance from said static imbalance and said dynamic imbalance; and applying a single weight to said hard disk assembly to correct said greater imbalance without requiring the use of a second weight.

28. The method of claim 27 wherein said determining a greater imbalance comprises comparing said static imbalance and said dynamic imbalance to balance specifications of said hard disk assembly.

29. The method of claim 27 further comprising measuring said hard disk assembly after application of said single counter-balance weight for conformance to both a static and a dynamic balance specifications.

30. The method of claim 27 wherein said single weight is selected from a fixed set of available weights.

31. The method of claim 27 wherein said single weight is applied to approximately the top of said hard disk assembly.

32. The method of claim 27 wherein said single weight is applied to approximately the bottom of said hard disk assembly.

33. The method of claim 27 wherein said single weight is applied to approximately the middle of said hard disk assembly.

34. The method of claim 27 wherein said static and said dynamic imbalances comprise a plurality of force measurements measured from a top and a bottom disk of the plurality of disks.

* * * * *